United States Patent
Liu et al.

(10) Patent No.: US 11,503,501 B2
(45) Date of Patent: Nov. 15, 2022

(54) METHOD AND APPARATUS FOR LINK STATUS NOTIFICATION

(71) Applicant: Huawei Technologies Co., Ltd., Shenzhen (CN)

(72) Inventors: Fengwei Liu, Chengdu (CN); Lei Chen, Shenzhen (CN); Gao Xiang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 6 days.

(21) Appl. No.: 16/875,585

(22) Filed: May 15, 2020

(65) Prior Publication Data

US 2020/0280879 A1    Sep. 3, 2020

Related U.S. Application Data

(63) Continuation of application No. PCT/CN2018/116028, filed on Nov. 16, 2018.

(30) Foreign Application Priority Data

Nov. 17, 2017   (CN) ......................... 201711147924.4

(51) Int. Cl.
*H04W 28/06* (2009.01)
*H04L 51/224* (2022.01)
(Continued)

(52) U.S. Cl.
CPC ............ *H04W 28/06* (2013.01); *H04L 51/224* (2022.05); *H04L 67/54* (2022.05); *H04W 24/04* (2013.01)

(58) Field of Classification Search
CPC ....... H04L 47/365; H04L 51/24; H04L 67/24; H04W 28/06; H04W 24/04
See application file for complete search history.

(56) References Cited

U.S. PATENT DOCUMENTS 6,594,232 B1 * 7/2003 Dupont ................. H04L 12/437
370/222
7,813,740 B2 * 10/2010 Wei ....................... H04W 52/40
455/453

(Continued)

FOREIGN PATENT DOCUMENTS

CN        102572905 A       7/2012
CN        102857379 A       1/2013
(Continued)

OTHER PUBLICATIONS

3GPP TS 38.300, "3rd Generation Partnership Project; Technical Specification Group Radio Access Network; NR; NR and NG-RAN Overall Description; Stage 2 (Release 15)", Nov. 2017, 6 pages, V1.2.1.

(Continued)

*Primary Examiner* — Jenee Holland
(74) *Attorney, Agent, or Firm* — Slater Matsil, LLP (57) ABSTRACT

This application provides a signal transmission method and apparatus. The method is applied to a communications system including at least three nodes, a second node in the at least three nodes communicates with a third node by using a first node, and the method includes: determining, by the first node, a status of a link between the first node and the second node; and sending, by the first node, first notification information to the third node when determining that the link between the first node and the second node is abnormal, where the first notification information is used to indicate that the link between the first node and the second node is abnormal.

20 Claims, 7 Drawing Sheets

(51) Int. Cl.
  *H04L 67/54* (2022.01)
  *H04W 24/04* (2009.01)
  *H04L 41/0668* (2022.01)
  *H04L 41/0654* (2022.01)
  *H04L 43/06* (2022.01)
  *H04L 43/0811* (2022.01)

(56) References Cited

U.S. PATENT DOCUMENTS

| | | | | |
|---|---|---|---|---|
| 8,331,222 | B2* | 12/2012 | Yan | H04L 41/0654 370/225 |
| 8,402,122 | B2* | 3/2013 | Cho | H04L 67/51 370/310 |
| 8,406,126 | B1* | 3/2013 | Leiba | H04L 1/22 370/222 |
| 9,237,092 | B2* | 1/2016 | Chen | H04L 12/40032 |
| 9,680,948 | B2* | 6/2017 | Sigoure | H04L 67/56 |
| 2003/0117950 | A1* | 6/2003 | Huang | H04L 45/00 370/220 |
| 2006/0056286 | A1 | 3/2006 | Lim et al. | |
| 2006/0187845 | A1 | 8/2006 | Busi et al. | |
| 2007/0019646 | A1* | 1/2007 | Bryant | H04L 45/48 370/390 |
| 2007/0177523 | A1* | 8/2007 | Nagami | H04L 41/147 370/252 |
| 2008/0056196 | A1* | 3/2008 | Ito | H04W 40/24 370/331 |
| 2008/0130503 | A1* | 6/2008 | Kaempfer | H04L 49/555 370/235 |
| 2008/0159125 | A1* | 7/2008 | Ando | H04W 8/12 370/221 |
| 2008/0225699 | A1* | 9/2008 | Lee | H04L 45/02 370/218 |
| 2008/0259784 | A1* | 10/2008 | Allan | H04L 45/32 370/216 |
| 2009/0016214 | A1* | 1/2009 | Alluisi | H04L 49/557 370/228 |
| 2009/0109838 | A1* | 4/2009 | Kuo | H04W 76/18 370/216 |
| 2009/0147672 | A1* | 6/2009 | Chun | H04L 12/437 370/225 |
| 2009/0175166 | A1* | 7/2009 | Long | H04L 45/48 370/225 |
| 2010/0260041 | A1* | 10/2010 | Yan | H04L 45/023 370/225 |
| 2010/0322068 | A1* | 12/2010 | Grahn | H04W 76/11 370/244 |
| 2012/0147735 | A1* | 6/2012 | Wang | H04L 12/437 370/217 |
| 2012/0170487 | A1* | 7/2012 | Wu | H04L 12/437 370/254 |
| 2013/0077474 | A1* | 3/2013 | Long | H04L 12/4637 370/222 |
| 2014/0056235 | A1* | 2/2014 | Liu | H04W 76/22 370/329 |
| 2014/0071835 | A1* | 3/2014 | Sun | H04L 43/06 370/242 |
| 2014/0105028 | A1* | 4/2014 | Bhaskaran | H04W 56/0035 370/242 |
| 2014/0341047 | A1* | 11/2014 | Sadeh | H04W 76/11 370/252 |
| 2015/0124837 | A1* | 5/2015 | Saltsidis | H04L 41/0879 370/419 |
| 2015/0207674 | A1 | 7/2015 | Wu et al. | |
| 2016/0352570 | A1* | 12/2016 | Holness | H04L 12/437 |
| 2017/0303145 | A1* | 10/2017 | Yang | H04W 76/22 |
| 2017/0311371 | A1* | 10/2017 | Olsson | H04W 76/19 |

FOREIGN PATENT DOCUMENTS

| | | |
|---|---|---|
| CN | 103229456 A | 7/2013 |
| EP | 2387270 A1 | 11/2011 |
| EP | 2534777 A2 | 12/2012 |
| EP | 2874351 A1 | 5/2015 |
| EP | 2770666 B1 | 9/2018 |
| WO | 2011099802 A2 | 8/2011 |

OTHER PUBLICATIONS

3GPP TS 38.331, "3rd Generation Partnership Project; Technical Specification Group Radio Access Network; NR; Radio Resource Control (RRC); Protocol specification (Release 15)", Oct. 2017, 24 pages, V0.1.0.

\* cited by examiner

METHOD AND APPARATUS FOR LINK STATUS NOTIFICATION

CROSS-REFERENCE TO RELATED APPLICATIONS

This application is a continuation of International Application No. PCT/CN2018/116028, filed on Nov. 16, 2018, which claims priority to Chinese Patent Application No. 201711147924.4, filed on Nov. 17, 2017. The disclosures of the aforementioned applications are hereby incorporated by reference in their entireties.

TECHNICAL FIELD

This application relates to the communications field, and more specifically, to a signal transmission method and apparatus.

BACKGROUND

Due to a deployment cost problem in new radio (NR), it is very difficult for an operator to resolve a coverage hole problem by relying on only a wired transmission reception point (TRP). Therefore, a communications system including a relay transmission reception point (rTRP) configured with a wireless backhaul link is introduced.

A beam may fail on a link between devices in the communications system. The link may further fail if the failed beam cannot be quickly recovered, or the link may fail due to another cause. In a case of a link abnormality regardless of a cause, a current node cannot communicate with an upper-level node or a lower-level node in a specific period, and consequently the upper-level node cannot serve the lower-level node. After a link between devices in the communications system is abnormal, how to perform subsequent processing to improve communication quality or communication efficiency is an urgent problem to be resolved.

SUMMARY

This application provides a signal transmission method and apparatus, and the method can improve communication quality or communication efficiency.

According to a first aspect, a signal transmission method is provided. The method is applied to a communications system including at least three nodes, a second node in the at least three nodes communicates with a third node by using a first node, and the method includes: determining, by the first node, a status of a link between the first node and the second node; and sending, by the first node, first notification information to the third node when determining that the link between the first node and the second node is abnormal, where the first notification information is used to indicate that the link between the first node and the second node is abnormal.

The first node determines the status of the link between the first node and the second node, and sends, to the third node when the link is abnormal, the first notification information used to indicate that the link between the first node and the second node is abnormal, so that the third node performs corresponding signal processing based on the first notification information. This improves communication efficiency.

In some possible implementations, the sending, by the first node, first notification information to the third node when determining that the link between the first node and the second node is abnormal includes: recovering, by the first node, the link when determining that the link between the first node and the second node is abnormal; and when a first preset time threshold is reached, sending, by the first node, the first notification information to the third node if the link fails to be recovered.

In this way, the first node can prevent a waste of signaling overheads caused by sending the first notification information due to a transient link abnormality.

In some possible implementations, the method further includes: sending, by the first node, second notification information to the third node if the link is successfully recovered within a second preset time threshold, where the second notification information is used to indicate that the link is recovered.

The first node sends the second notification information to the third node, so that the third node can quickly recover a link between the third node and the second node. This prevents link re-establishment, and therefore reduces a communication delay.

In some possible implementations, the second node is a lower-level node of the first node, and the first notification information further includes at least one of a link abnormality type and an amount of data that is buffered by the first node and that is to be sent to the third node.

If there is a relatively large amount of buffered data, the third node may quickly perform link switching; or if there is a relatively small amount of buffered data, the third node may wait for link recovery. This improves communication efficiency.

In some possible implementations, the second node is an upper-level node of the first node, and the first notification information further includes at least one of link wait-to-restore time and a time-frequency resource position for link wait to restore.

The first node may set the link wait-to-restore time, and notify the third node of the link wait-to-restore time by using the first notification information. In this way, the third node waits for link recovery when the link wait-to-restore time does not expire, and performs link switching only when the link wait-to-restore time expires. This prevents low communication efficiency caused by long-time link recovery waiting or no link recovery waiting.

The first node may further set the time-frequency resource position for link wait to restore, and notify the third node of the time-frequency resource position by using the first notification information. Therefore, the third node may detect the second notification information at the time-frequency resource position, and the second notification information is used to indicate that the link is successfully recovered. This prevents the third node from performing switching to another link, and therefore eliminates a delay caused by establishing a link connection to another link.

In some possible implementations, the second node is a lower-level node of the first node, and the determining, by the first node, a status of a link between the first node and the second node includes: if the first node does not receive, within a third preset time threshold, a response message that is sent by the second node and that corresponds to uplink scheduling information or feedback information that is sent by the second node and that indicates whether a downlink signal is successfully received, determining, by the first node, that the link between the first node and the second node is abnormal.

In some possible implementations, the second node is a lower-level node of the first node, and the method further includes: determining, by the first node, quality of the link between the first node and the second node; and the determining, by the first node, a status of a link between the first node and the second node includes: when the link quality is less than a preset quality threshold, determining, by the first node, that the link between the first node and the second node is abnormal.

According to a second aspect, a signal transmission method is provided. The method is applied to a communications system including at least three nodes, a second node in the at least three nodes communicates with a third node by using a first node, and the method includes: receiving, by the third node, first notification information, where the first notification information is used to indicate that a link between the first node and the second node is abnormal; and performing, by the third node, signal processing based on the first notification information.

When the second node is an upper-level node of the first node and the first node is an upper-level node of the third node, the third node measures another available link, performs link switching, or waits for link recovery. Alternatively, when the second node is a lower-level node of the first node and the first node is a lower-level node of the third node, the third node stops sending data of the second node by using the first node. This improves signal processing efficiency.

In some possible implementations, the second node is a lower-level node of the first node, and the first notification information further includes at least one of a link abnormality type and an amount of data that is buffered by the first node and that is to be sent to the third node.

In some possible implementations, the second node is an upper-level node of the first node, and the first notification information further includes at least one of link wait-to-restore time and a first time-frequency resource position for link wait to restore.

In some possible implementations, when the first notification information includes the link wait-to-restore time, the performing, by the third node, signal processing based on the first notification information includes: detecting, by the third node, second notification information within the link wait-to-restore time, where the second notification information is used to indicate that the link is recovered; and when receiving the second notification information, recovering, by the third node, a link connection to the second node.

In this way, the third node can quickly recover the connection to the second node by using the first node. This eliminates a link re-establishment delay.

In some possible implementations, when the first notification information includes the time-frequency resource position for link wait to restore, the performing, by the third node, signal processing based on the first notification information includes: detecting, by the third node, the second notification information at the first time-frequency resource position for link wait to restore, where the second notification information is used to indicate that the link is recovered; and when receiving the second notification information, recovering, by the third node, the link connection to the second node.

In some possible implementations, the method further includes: if the second notification information is not received when the link wait-to-restore time expires, switching, by the third node, to a link between the third node and a fourth node, where the fourth node is used for communication between the third node and the second node, and the fourth node is different from the first node.

In some possible implementations, the method further includes: sending, by the third node, the second notification information to a fifth node, where the fifth node may communicate with the first node by using the third node.

In some possible implementations, the method further includes: sending, by the third node, the first notification information to the fifth node, where the fifth node may communicate with the first node by using the third node.

According to a third aspect, a signal transmission apparatus is provided. The signal transmission apparatus may be an access network device, or may be a chip in the access network device. The apparatus has functions of implementing any embodiment of the first aspect. The functions may be implemented by hardware, or may be implemented by hardware executing corresponding software. The hardware or the software includes one or more units corresponding to the foregoing functions.

In a possible design, when the apparatus is an access network device, the access network device includes a processing unit and a transceiver unit. The processing unit may be, for example, a processor. The transceiver unit may be, for example, a transceiver, and the transceiver includes a radio frequency circuit. Optionally, the access network device further includes a storage unit, and the storage unit may be, for example, a memory. When the access network device includes the storage unit, the storage unit is configured to store a computer-executable instruction. The processing unit is connected to the storage unit, and the processing unit executes the computer-executable instruction stored in the storage unit, so that the access network device performs the signal transmission method according to any one of the first aspect or all possible implementations of the first aspect.

In another possible design, when the apparatus is a chip in the access network device, the chip includes a processing unit and a transceiver unit. The processing unit may be, for example, a processor. The transceiver unit may be, for example, an input/output interface, a pin, or a circuit on the chip. The processing unit may execute a computer-executable instruction stored in a storage unit, so that the chip in the access network device performs the signal transmission method according to any one of the first aspect or all possible implementations of the first aspect. Optionally, the storage unit may be a storage unit in the chip, such as a register or a buffer; or the storage unit may be a storage unit in the access network device but outside the chip, such as a read-only memory (ROM), another type of static storage device capable of storing static information and an instruction, or a random access memory (RAM).

The processor mentioned in any of the foregoing designs may be a general-purpose central processing unit (CPU), a microprocessor, an application-specific integrated circuit (ASIC), or one or more integrated circuits for controlling program execution of the signal transmission method according to the first aspect.

According to a fourth aspect, this application provides a signal transmission apparatus. The apparatus may be an access network device, or may be a terminal device, or may be a chip in the access network device, or may be a chip in the terminal device. The signal transmission apparatus has functions of implementing all embodiments of the second aspect. The functions may be implemented by hardware, or may be implemented by hardware executing corresponding software. The hardware or the software includes one or more units corresponding to the foregoing functions.

In a possible design, when the signal transmission apparatus is an access network device or a terminal device, the access network device or the terminal device includes a processing unit and a transceiver unit. The processing unit may be, for example, a processor. The transceiver unit may be, for example, a transceiver, and the transceiver includes a radio frequency circuit. Optionally, the terminal device further includes a storage unit, and the storage unit may be, for example, a memory. When the terminal device includes the storage unit, the storage unit is configured to store a computer-executable instruction. The processing unit is connected to the storage unit, and the processing unit executes the computer-executable instruction stored in the storage unit, so that the terminal device performs the signal transmission method according to any one of the second aspect or all possible implementations of the second aspect.

In another possible design, when the apparatus is a chip in the access network device or a chip in the terminal device, the chip includes a processing unit and a transceiver unit. The processing unit may be, for example, a processor. The transceiver unit may be, for example, an input/output interface, a pin, or a circuit on the chip. The processing unit may execute a computer-executable instruction stored in a storage unit, so that the chip in the terminal device performs the signal transmission method according to any one of the second aspect or all possible implementations of the second aspect. Optionally, the storage unit is a storage unit in the chip, for example, a register or a buffer, or the storage unit may be a storage unit in the terminal device but outside the chip, such as a ROM, another type of static storage device capable of storing static information and an instruction, or a RAM.

The processor mentioned in any one of the foregoing designs may be a CPU, a microprocessor, an ASIC, or one or more integrated circuits for controlling program execution of the signal transmission method according to the second aspect.

According to a fifth aspect, a computer storage medium is provided. The computer storage medium stores program code, and the program code is used to indicate an instruction of executing the method according to any one of the first aspect or all possible implementations of the first aspect or the method according to any one of the second aspect or all possible implementations of the second aspect.

According to a sixth aspect, a computer program product including an instruction is provided. When the computer program product is run on a computer, the computer is enabled to perform the method according to any one of the first aspect or all possible implementations of the first aspect or the method according to any one of the second aspect or all possible implementations of the second aspect.

According to the foregoing solutions, in embodiments of this application, the first node determines the status of the link between the first node and the second node, and sends, to the third node when the link is abnormal, the first notification information used to indicate that the link between the first node and the second node is abnormal, so that the third node performs corresponding signal processing based on the first notification information. This improves communication efficiency.

DETAILED DESCRIPTION OF ILLUSTRATIVE EMBODIMENTS

The following describes technical solutions of this application with reference to accompanying drawings.

The technical solutions of the embodiments of this application may be applied to various communications systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, a future 5th generation (5G) system, or a new radio (NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless telephone set, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

An access network device in the embodiments of this application may be an access network device configured to communicate with a terminal device. The access network device may be a base transceiver station (BTS) in the global system for mobile communications (GSM) or the code division multiple access (CDMA) system, or may be a NodeB (NB) in the wideband code division multiple access (WCDMA) system, or may be an evolved NodeB (eNB or eNodeB) in the LTE system, or may be a radio controller in a cloud radio access network (CRAN) scenario. Alternatively, the access network device may be a relay node, an access point, a vehicle-mounted device, a wearable device, an access network device in the future 5G network, an access network device in the future evolved PLMN, or the like. This is not limited in the embodiments of this application.

Due to a deployment cost problem in new radio (NR), it is very difficult for an operator to resolve a coverage hole problem by relying on only a wired transmission reception point (TRP). Therefore, a relay transmission reception point (rTRP) configured with a wireless backhaul link is introduced.

Figure 1:
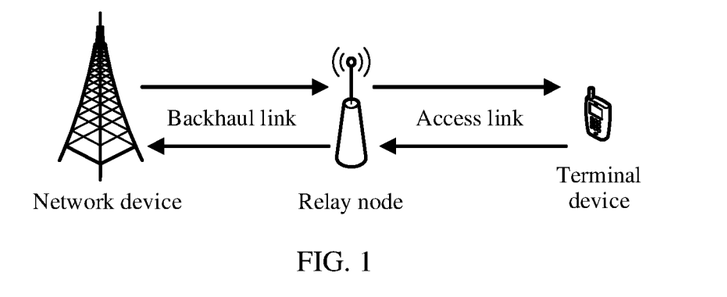
FIG. 1 is a schematic diagram of an application scenario according to an embodiment of this application.

FIG. 1 is a schematic diagram of an application scenario according to an embodiment of this application. A communications system shown in FIG. 1 includes three types of nodes: a network device, a relay device, and a terminal device. A link between the network device and the relay device may be referred to as a "backhaul (BH) link", and a link between the relay device and the terminal device may be referred to as an "access (AC) link".

Figure 2:
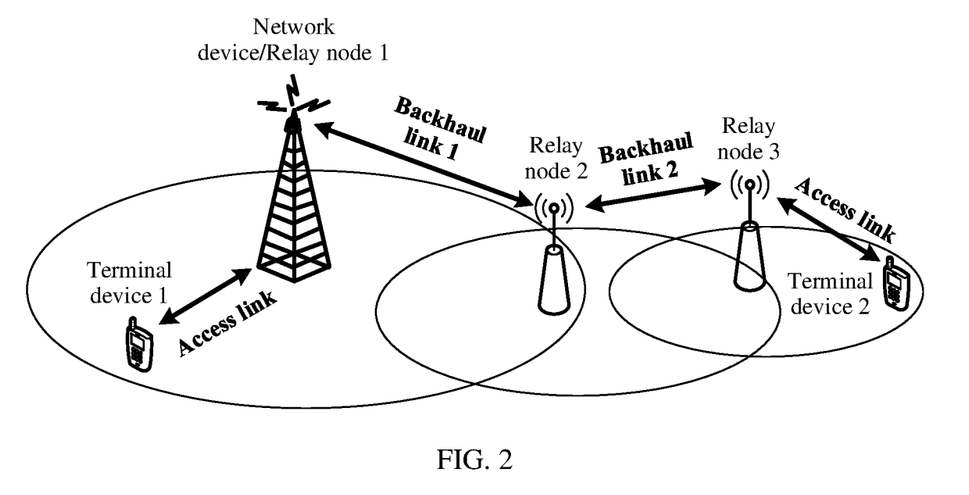
FIG. 2 is a schematic diagram of another application scenario according to an embodiment of this application.

FIG. 2 is a schematic diagram of another application scenario according to an embodiment of this application. A communications system shown in FIG. 2 includes an access network device, a plurality of relay nodes, and a terminal device. In other words, the access network device may communicate with the terminal device by using the plurality of relay nodes (for example, a relay node 2 and a relay node 3 in FIG. 2). A link between two relay nodes may also be referred to as a "backhaul link".

It should be understood that the communications system in the embodiments of this application imposes no limitation on a quantity of relay devices. For example, the communications system may include four or five relay devices.

It should be further understood that this application imposes no limitation on names of a link between an access network device and a relay device, a link between two relay devices, and a link between a relay device and a terminal device.

Figure 3:
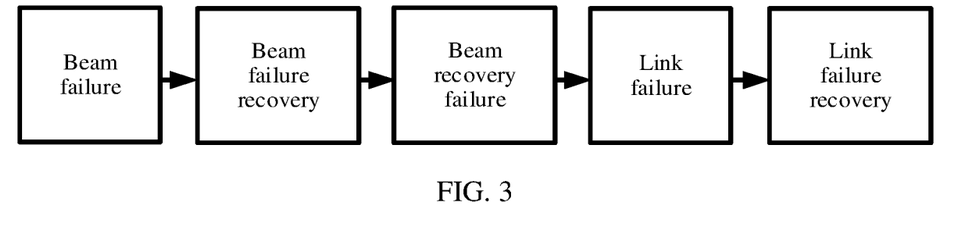
FIG. 3 is a schematic diagram of a beam failure and a link failure.

For example, in a high frequency band, a beam may fail on a link between devices. As shown in FIG. 3, the link may further fail if the failed beam cannot be quickly recovered, or the link may fail due to another cause. In a case of a link abnormality regardless of a cause, a current node cannot communicate with an upper-level node or a lower-level node in a specific period, and consequently the upper-level node cannot serve the lower-level node. For example, as shown in FIG. 2, a backhaul link 1 and/or a backhaul link 2 may be abnormal. When either of the backhaul link 1 and the backhaul link 2 is abnormal, for example, when the backhaul link 2 is abnormal, communication between the relay node 2 and the relay node 3 cannot be performed, and communication between the relay node 2 and a terminal device 2 is also interrupted.

The upper-level node may be any one of the foregoing access network devices, or may be a relay node (RN) or an rTRP; the current node may be an RN or an rTRP; and the lower-level node may be an RN or an rTRP, or may be any one of the foregoing terminal devices.

After a link between devices in the communications system is abnormal, how to perform subsequent processing to improve communication quality or communication efficiency is an urgent problem to be resolved.

Figure 4:
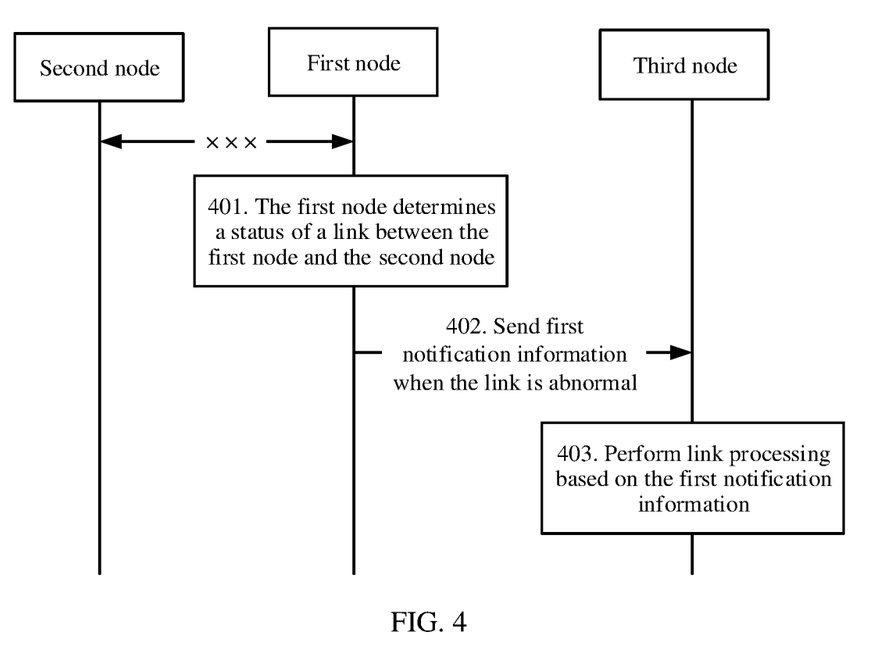
FIG. 4 is a schematic flowchart of a signal transmission method according to an embodiment of this application.

FIG. 4 is a schematic flowchart of a signal transmission method according to an embodiment of this application.

This embodiment of this application is applied to a communications system including at least three nodes. For example, the communications system includes a first node, a second node, and a third node, and the second node communicates with the third node by using the first node. In other words, the second node needs to communicate with the third node through relaying of the first node.

It should be noted that the first node may be an upper-level node of the second node, and the third node is an upper-level node of the first node. In this case, the third node may be any one of the foregoing access network devices, or may be a relay node (RN) or an rTRP; the first node may be an RN or an rTRP; and the second node may be an RN or an rTRP, or may be any one of the foregoing terminal devices.

Alternatively, the first node is an upper-level node of the third node, and the second node is an upper-level node of the first node. This is not limited in this application. In this case, the second node may be any one of the foregoing access network devices, or may be a relay node (RN) or an rTRP; the first node may be an RN or an rTRP; and the third node may be an RN or an rTRP, or may be any one of the foregoing terminal devices.

401. The first node determines a status of a link between the first node and the second node.

Specifically, the link status includes at least a normal state and an abnormal state. An abnormality of a link between two nodes may be a beam failure, a link failure, or a link abnormality determined by using another criterion, and the beam failure further causes the link failure. It should be noted that the first node can determine a beam failure, a link failure, or the like only when the first node is a lower-level node of the second node. When the first node is an upper-level node of the second node, the first node may determine a link quality problem in another manner, but does not explicitly define a status such as a beam failure or a link failure.

It should be noted that, in the case of the beam failure, the link may be determined to be abnormal as long as the beam failure is detected, or the link may be determined to be abnormal as long as recovery of the failed beam fails. Similarly, in the case of the link failure, the link may be determined to be abnormal as long as the failure is detected, or the link may be determined to be abnormal as long as recovery of the link fails.

It should be noted that the beam failure and a corresponding recovery procedure in this application may also be referred to as a link reconfiguration procedure. In the link reconfiguration procedure, the beam failure may be defined as that link quality of each of several reference signals is less than a specified threshold. Similarly, the beam recovery failure may also be referred to as a link reconfiguration failure.

Optionally, the second node is a lower-level node of the first node. In other words, the second node is a lower-level node, and the first node is an upper-level node. In this case, the upper-level node may determine the link status based on quality of the link between the upper-level node and the lower-level node.

Specifically, the first node may determine the link quality by using a transmission signal between the first node and the second node. If the link quality is less than a preset quality threshold, the first node determines that the link between the first node and the second node is abnormal. Correspondingly, if the link quality is greater than or equal to the preset quality threshold, the first node determines that the link between the first node and the second node is normal.

Optionally, the link quality may be physical uplink control channel (PUCCH) quality.

Optionally, the control channel quality is determined based on a demodulation reference signal (DMRS) of a control channel, or may be quality of a channel on which a reference signal (for example, a sounding reference signal (SRS) or a DMRS) sent by a lower-level node is located.

It should be noted that the link failure or the beam failure may be determined based on a relationship between control channel quality and a preset quality threshold. However, a preset quality threshold for determining the link failure may be different from a preset quality threshold for determining the beam failure.

It should be understood that the foregoing manner in which an upper-level node determines a status of a link between the upper-level node and a lower-level node based on link quality may also be applied to a case in which a lower-level node determines a status of a link between the lower-level node and an upper-level node. This is not limited in this application. Optionally, the link quality may be physical downlink control channel (PDCCH) quality. Optionally, the control channel quality is determined based on a DMRS of a control channel, or may be quality of a channel on which a reference signal (for example, a channel state information-reference signal (CSI-RS), or a synchronization signal (SS)/physical broadcast channel (PBCH) block) sent by an upper-level node is located.

Optionally, if the second node is a lower-level node of the first node, because the second node needs to communicate with the third node by using the first node, the first node is a lower-level node of the third node. The first node may determine the status of the link between the first node and the second node based on whether the first node receives, within a third preset time threshold, a response message that is sent by the second node and that corresponds to uplink scheduling information or feedback information that is sent by the second node and that indicates whether a downlink signal is successfully received.

Specifically, the first node determines the status of the link between the first node and the second node. In other words, an upper-level node needs to determine a status of a link between the upper-level node and a lower-level node. The first node may send the uplink scheduling information to the second node. After receiving the uplink scheduling information, the second node transmits an uplink signal on a scheduling resource indicated by the uplink scheduling information. If the first node receives the response message or receives the uplink signal on the scheduling resource indicated by the uplink scheduling information, the first node determines that the link between the first node and the second node is normal; otherwise, the first node determines that the link between the first node and the second node is abnormal.

Alternatively, the first node may send a downlink signal to the second node. When receiving the downlink signal, the second node may send feedback information (for example, a acknowledgement (ACK) or a negative acknowledgement (NACK)) to the first node to notify the first node of whether the downlink signal is successfully received. If the first node receives NACKs for K consecutive times or the first node does not receive ACK/NACK information for K consecutive times, the first node determines that the link between the first node and the second node is abnormal.

402. The first node sends first notification information to the third node when determining that the link between the first node and the second node is abnormal, where the first notification information is used to indicate that the link between the first node and the second node is abnormal.

Optionally, the first notification information may be sent through dedicated signaling, or may be carried in other signaling.

For example, the first notification information may be carried in physical layer signaling (L1) (for example, downlink control information (DCI) or uplink control information (UCI) signaling), data link layer signaling (L2) (for example, media access control control element (MAC CE) signaling), or network layer signaling (L3) (for example, radio resource control (RRC)). This is not limited in this application.

Optionally, the first notification information may be transmitted on a random access channel (RACH).

Optionally, when the second node is an upper-level node of the first node and the first node is an upper-level node of the third node, the first notification information may further include at least one of a link abnormality type, link wait-to-restore time, a time-frequency resource position for link wait to restore, an amount of data buffered by the first node, indication information indicating whether the third node needs to immediately perform cell search, indication information indicating whether the third node needs to feed back a cell search result, and indication information indicating whether the first notification information needs to be forwarded to a lower-level node of the third node.

Specifically, the link abnormality type may include the following: a link abnormality due to a beam failure; a link failure due to another cause; or link quality less than a preset quality threshold. The third node may determine, based on the link abnormality type, how to perform subsequent processing, for example, waiting for link recovery, or switching to another link.

For example, the first node may set the link wait-to-restore time, and notify the third node of the link wait-to-restore time by using the first notification information. In this way, the third node waits for link recovery before the link wait-to-restore time expires, and performs link switching only when the link wait-to-restore time expires. This prevents low communication efficiency caused by long-time link recovery waiting or no link recovery waiting.

The first node may further set the time-frequency resource position for link wait to restore, and notify the third node of the time-frequency resource position by using the first notification information. In this way, the third node may detect second notification information at the time-frequency resource position, where the second notification information is used to indicate that the link is successfully recovered. This prevents the third node from performing switching to another link, and therefore eliminates a delay caused by establishing a link connection to another link.

The first notification information may include the amount of data buffered by the first node, so that the third node determines link processing based on the amount of data. For example, if there is a relatively large amount of buffered data, the third node may quickly perform link switching; or if there is a relatively small amount of buffered data, the third node may wait for link recovery.

The first notification information may include the indication information indicating whether the third node needs to immediately perform cell search. In other words, the first notification information directly indicates whether the third node needs to perform link switching.

The first notification information may include the indication information indicating whether the third node needs to forward the first notification information to a lower-level node of the third node, so that the subsequent node can also perform corresponding processing based on the first notification information.

Optionally, when the second node is a lower-level node of the first node and the first node is a lower-level node of the third node, the first notification information may further include at least one of a link abnormality type and an amount of data that is buffered by the first node and that is to be sent to the third node.

Specifically, a source node of the amount of data that is buffered by the first node and that is to be sent to the third node may be the first node. Alternatively, a source node of the amount of data is the second node. In other words, an amount of data of the second node needs to be forwarded by the first node to the third node.

Optionally, when the first node determines that the link is abnormal as long as the first node detects a link failure, the first node may further recover the link between the first node and the second node, and set a first preset time threshold. If the link fails to be recovered when the first preset time threshold is reached, the first node sends the first notification information to the second node. If the link is successfully recovered when or before the first preset time threshold is reached, the first node does not need to send the first notification information to the second node.

It should be understood that, if the status of the link between the first node and the second node is determined based on whether the first node receives, within the third preset time threshold, the response message that is sent by the second node and that is for the uplink scheduling information or the feedback information that is sent by the second node and that indicates whether the downlink signal is successfully received, the first preset time threshold is greater than the third preset time threshold.

Figure 5:
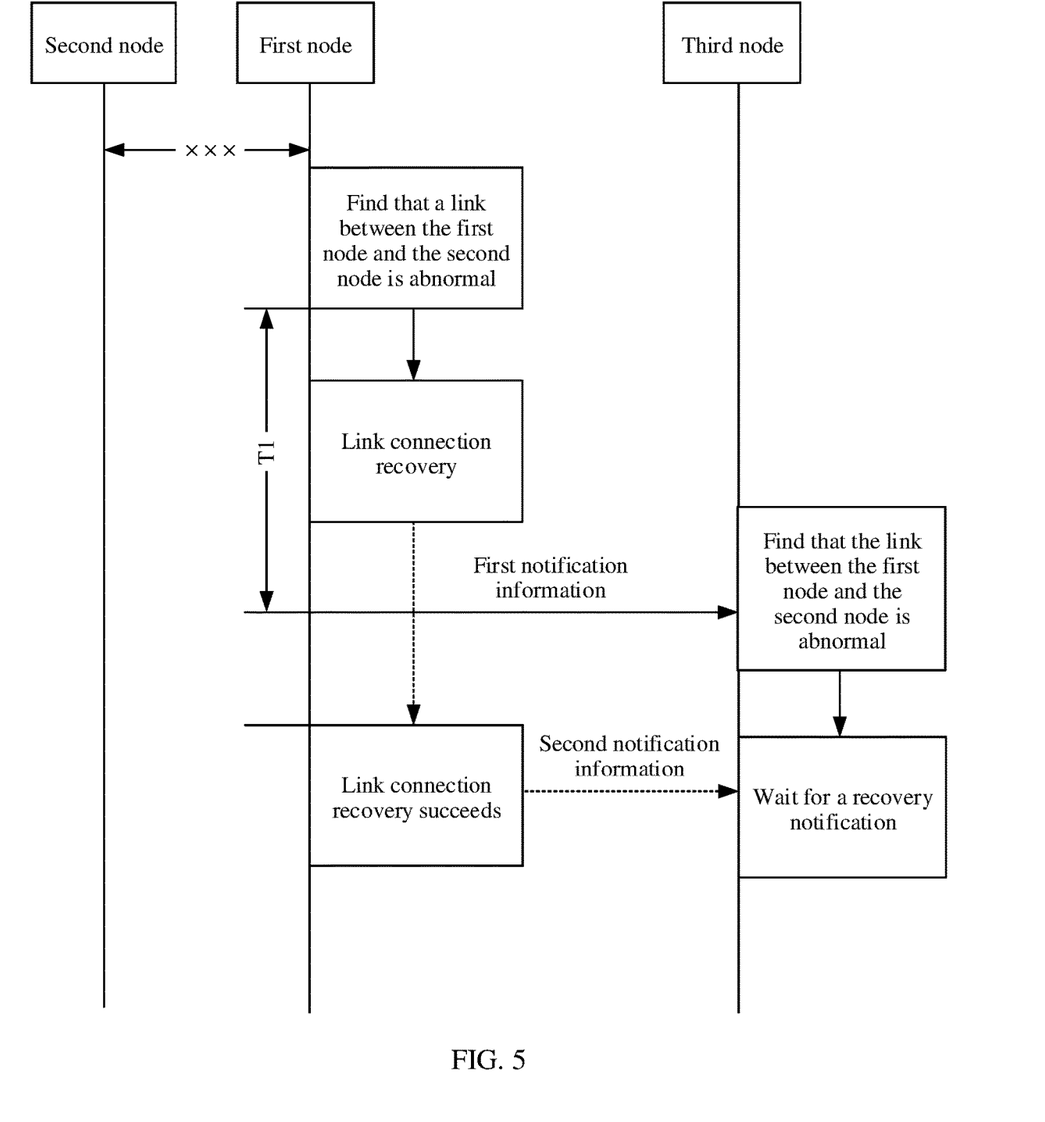
FIG. 5 is a schematic diagram of a signal transmission method according to another embodiment of this application.

For example, as shown in FIG. 5, within a T1 time period starting from a moment at which the first node determines that the link between the first node and the second node is abnormal, the first node recovers the link. If the link still fails to be recovered when T1 expires, the first node sends the first notification information to the third node.

Optionally, when the second node is a lower-level node of the first node, the first notification information may be explained as information of second node loss.

Optionally, after sending the first notification information, the first node may further continue to recover the link. If the link is successfully recovered, the first node sends the second notification information to the third node, and the second notification information is used to indicate that the link is recovered.

Optionally, the first node may also set a second time threshold. If the link is successfully recovered before the second time threshold is reached, the first node sends the second notification information to the third node. After the second time threshold is reached, the first node may not send the second notification information to the third node even if the link is successfully recovered.

It should be understood that the second preset time threshold is greater than the first preset time threshold.

In a possible implementation, the second notification information is implicit information. In other words, although the second notification information does not contain an explicit link recovery indication instruction, after the third node receives the second notification information, the third node may explicitly learn that the link is recovered.

For example, when the third node is a lower-level node, after the first node sends the first notification information, the first node does not schedule the third node to send a PUSCH. In other words, the first node does not send uplink scheduling DCI. After the link is recovered, the first node resumes sending the uplink scheduling DCI included in the PDCCH. Therefore, if the PDCCH received by the third node includes the uplink scheduling DCI, the third node may determine that the link is recovered. In this example, the uplink scheduling DCI may be used as implicit second notification information.

Optionally, the link status may further include a link interruption state.

Specifically, when a link is abnormal, a processing procedure is described above. When the first node does not recover the link within a preset time, a link interruption state is entered, and the first node notifies the third node of the link interruption state by using third notification information.

403. The third node performs signal processing based on the first notification information.

Specifically, if the third node receives the first notification information and determines that the link between the first node and the second node is abnormal, the third node may perform corresponding signal processing.

For example, when the second node is an upper-level node of the first node and the first node is an upper-level node of the third node, the third node measures another available link, performs link switching, or waits for link recovery.

When the second node is a lower-level node of the first node and the first node is a lower-level node of the third node, the third node stops sending data that belongs to the second node by using the first node.

Optionally, when the first notification information includes the link wait-to-restore time, the third node detects, within the link wait-to-restore time, the second notification information used to indicate that the link is recovered. When receiving the second notification information, the third node recovers a link connection to the first node. Therefore, the third node can quickly recover, by using the first node, a connection to the second node. This eliminates a link re-establishment delay.

Figure 6:
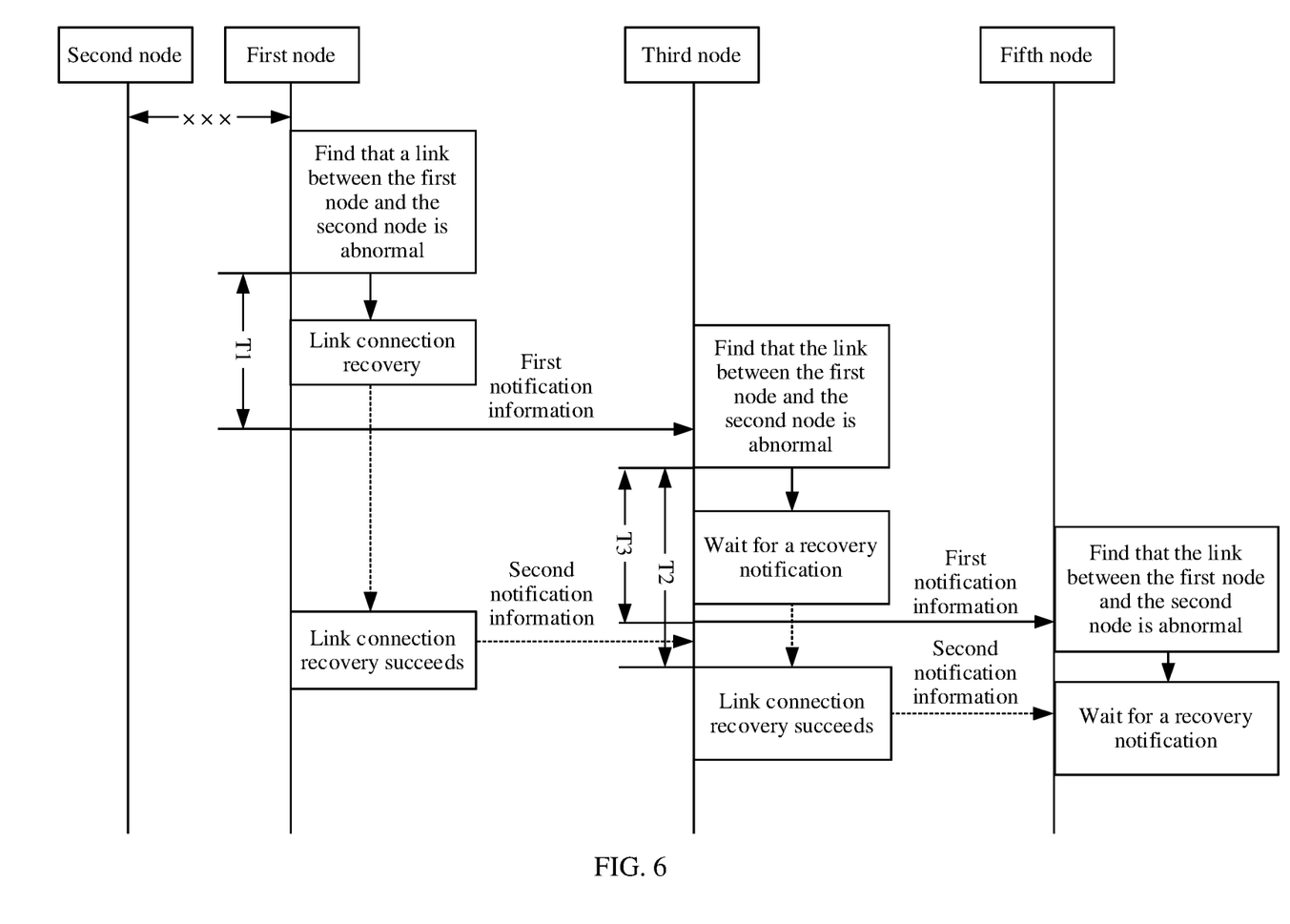
FIG. 6 is a schematic diagram of a signal transmission method according to still another embodiment of this application.

For example, as shown in FIG. 6, if the link wait-to-restore time is T2, and the third node detects the second notification information, the third node recovers the link connection between the third node and the first node.

Optionally, the link wait-to-restore time may be infinite. In other words, the third node needs to constantly detect the second notification information.

Optionally, the first node may also send link disconnection indication information to the third node. Therefore, the third node may stop detecting the second notification information. This prevents a resource waste.

Correspondingly, if the third node does not receive the second notification information when the link wait-to-restore time expires, the third node may detect another link and then perform link switching. For example, the third node may switch to a link connected to another relay node (for example, a fourth node, where the fourth node may be a relay node for the second node and the third node, and the fourth node is different from the first node).

Optionally, the third node may detect another link within the link wait-to-restore time to search for a proper link connection. Therefore, the proper link connection can be found when the link wait-to-restore time expires but no second notification information is received, and then link switching can be directly performed. This improves communication efficiency.

Optionally, when the first notification information includes the time-frequency resource position for link wait to restore, the third node detects, at the first time-frequency resource position for link wait to restore, the second notification information used to indicate that the link is recovered; and receives the second notification information, so that the third node can quickly recover the link connection to the second node by using the first node. This reduces a link establishment delay.

Correspondingly, if the third node does not receive the second notification information on the time-frequency resource for link wait to restore, the third node may detect another link and then perform link switching.

Optionally, when the first notification information includes the link wait-to-restore time and the time-frequency resource position for link wait to restore, the third node detects, within the link wait-to-restore time at the first time-frequency resource position for link wait to restore, the second notification information used to indicate that the link is recovered; and when receiving the second notification information, the third node recovers the link connection to the first node, so that the third node can further quickly recover communication with the second node. This eliminates a link re-establishment delay.

Correspondingly, if the third node does not receive the second notification information within the link wait-to-restore time on the time-frequency resource for link wait to restore, the third node may detect another link and then perform link switching.

Optionally, the third node may send the first notification information to a fifth node, and the fifth node is a lower-level node of the third node.

Specifically, the third node may voluntarily determine to send the first notification information to the fifth node, or may determine to send the first notification information to the fifth node based on indication information that is included in the first notification information and that indicates that the first notification information needs to be forwarded to the fifth node.

Optionally, after receiving the first notification information of the first node, the third node may voluntarily send the first notification information to the fifth node.

Optionally, if the link wait-to-restore time is T3, and the third node does not detect the second notification information when the time period T3 expires, the third node sends the first notification information to the fifth node.

Optionally, if the third node detects the second notification information, the third node may also send the second notification information to the fifth node.

For example, as shown in FIG. 6, the third node receives the first notification information, and determines, based on the first notification information, that the link between the first node and the second node is abnormal. The third node waits for a link recovery notification within the time period T2. If the third node does not receive the second notification information when the time period T2 expires, the third node sends the first notification information to the fifth node, and the fifth node determines, based on the first notification information, that the link between the first node and the second node is abnormal. If the third node receives the second notification information and detects that the link is successfully recovered, the third node sends the second notification information to the fifth node.

It should be noted that the first notification information and the second notification information that are sent by the third node to the fifth node respectively indicate that the link is abnormal and the link is recovered. The first notification information or the second notification information may be carried in different signaling, or may be carried in dedicated signaling. Therefore, signaling that is sent by the third node to the fifth node and that carries the first notification information may be the same as signaling that is sent by the first node to the third node and that carries the first notification information, or signaling that is obtained after being processed by the third node and that carries the first notification information is different from signaling that is obtained after being processed by the first node and that carries the first notification information.

Optionally, information sent by the third node to the fifth node clearly indicates that the link between the first node and the second node is abnormal or recovered.

Optionally, information sent by the third node to the fifth node indicates that a link between the third node and the first node is abnormal or recovered. In this case, the fifth node only learns that a problem occurs on a link above the third node, but does not learn of a specific link on which the problem occurs.

Optionally, if the third node does not receive the second notification information within a preset time, it may be considered by default that the link between the first node and the second node is in a link interruption state.

Therefore, according to the signal transmission method provided in this embodiment of this application, the first node determines the status of the link between the first node and the second node, and sends, to the third node when the link is abnormal, the first notification information used to indicate that the link between the first node and the second node is abnormal, so that the third node performs corresponding signal processing based on the first notification information. This improves communication efficiency.

It should be understood that the specific examples in the embodiments of this application are only intended to help a person skilled in the art better understand the embodiments of this application, rather than limit the scope of the embodiments of this application.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

The foregoing describes in detail the signal transmission methods in the embodiments of this application, and the following describes signal transmission apparatuses in the embodiments of this application.

Figure 7:
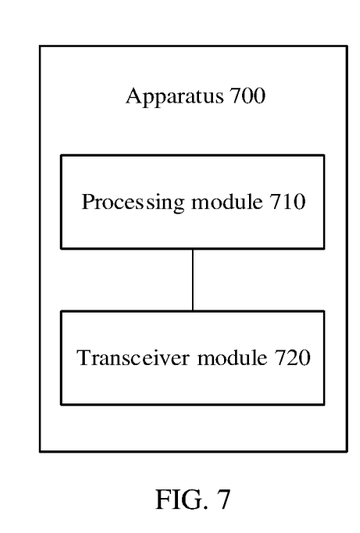
FIG. 7 is a schematic block diagram of a signal transmission apparatus according to an embodiment of this application.

FIG. 7 shows a signal transmission apparatus 700 according to an embodiment of this application. The signal transmission apparatus 700 may be the foregoing first node.

It should be understood that the signal transmission apparatus 700 may correspond to the first node in the foregoing method embodiment, and may have any function of the first node in the method.

The apparatus 700 is applied to a communications system including at least three nodes, a second node in the at least three nodes communicates with a third node by using a first node, and the apparatus 700 includes: a processing module 710, configured to determine a status of a link between the first node and the second node; and a transceiver module 720, configured to send first notification information to the third node when the link between the first node and the second node is abnormal, where the first notification information is used to indicate that the link between the first node and the second node is abnormal.

Optionally, the transceiver module 720 is specifically configured to: recover the link when the link between the first node and the second node is abnormal; and when a first preset time threshold is reached, send the first notification information to the third node if the link fails to be recovered.

Optionally, the transceiver module 720 is further configured to send second notification information to the third node if the link is successfully recovered within a second preset time threshold, where the second notification information is used to indicate that the link is recovered.

Optionally, the second node is a lower-level node of the first node, and the first notification information further includes at least one of a link abnormality type and an amount of data that is buffered by the first node and that is to be sent to the third node.

Optionally, the second node is an upper-level node of the first node, and the first notification information further includes at least one of link wait-to-restore time and a time-frequency resource position for link wait to restore.

Optionally, the second node is a lower-level node of the first node, and the processing module 710 is specifically configured to: if the first node does not receive, within a third preset time threshold, a response message that is sent by the second node and that corresponds to uplink scheduling information or feedback information that is sent by the second node and that indicates whether a downlink signal is successfully received, determine that the link between the first node and the second node is abnormal.

Optionally, the second node is a lower-level node of the first node, and the processing module 710 is further configured to determine quality of the link between the first node and the second node.

The processing module 710 is specifically configured to: when the link quality is less than a preset quality threshold, determine that the link between the first node and the second node is abnormal.

Therefore, in the signal transmission apparatus provided in this embodiment of this application, the first node determines the status of the link between the first node and the second node, and sends, to the third node when the link is abnormal, the first notification information used to indicate that the link between the first node and the second node is abnormal, so that the third node performs corresponding signal processing based on the first notification information. This improves communication efficiency.

Optionally, the signal transmission apparatus 700 in this embodiment of this application may be an access network device, or may be a chip in the access network device.

It should be understood that the signal transmission apparatus 700 according to this embodiment of this application may correspond to the first node in the signal transmission method in any of the embodiments in FIG. 4 to FIG. 6. In addition, the foregoing and other management operations and/or functions of the modules in the signal transmission apparatus 700 are used to implement corresponding steps in the foregoing method. For brevity, details are not described herein again.

Figure 8:
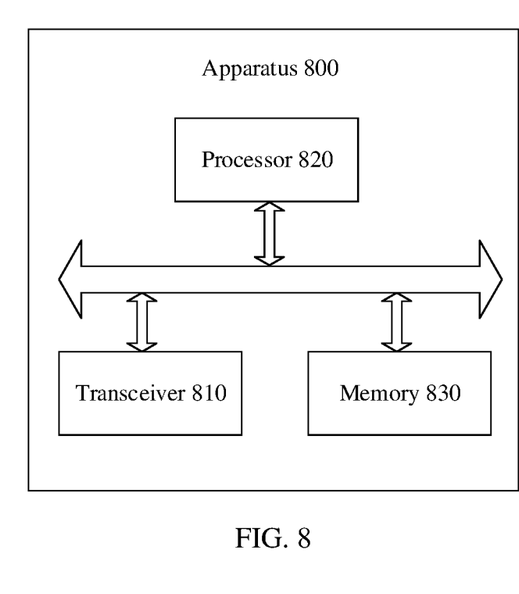
FIG. 8 is a schematic structural diagram of a signal transmission apparatus according to an embodiment of this application.

Optionally, in this embodiment of this application, if the signal transmission apparatus 700 is an access network device, the transceiver module 720 may be implemented as a transceiver 810, and the processing module 710 may be implemented as a processor 820. As shown in FIG. 8, a signal transmission apparatus 800 may include the transceiver 810, the processor 820, and a memory 830. The memory 830 may be configured to store indication information, and may be further configured to store code, an instruction, and the like that are executed by the processor 820. The transceiver 810 may include a radio frequency circuit. Optionally, the access network device further includes a storage unit.

The storage unit may be, for example, the memory. When the access network device includes the storage unit, the storage unit is configured to store a computer-executable instruction. The processing unit is connected to the storage unit, and the processing unit executes the computer-executable instruction stored in the storage unit, so that the access network device performs the foregoing signal transmission method.

Optionally, if the signal transmission apparatus 700 is a chip in the access network device, the chip includes a processing module 710 and a transceiver module 720. The transceiver module 720 may be implemented as the transceiver 810, and the processing module 710 may be implemented as the processor 820. The transceiver module may be, for example, an input/output interface, a pin, or a circuit. The processing module may execute a computer-executable instruction stored in a storage unit. The storage unit is a storage unit in the chip, such as a register or a buffer; or the storage unit may be a storage unit in the access network device but outside the chip, such as a read-only memory (ROM), another type of static storage device capable of storing static information and an instruction, or a random access memory (RAM).

Figure 9:
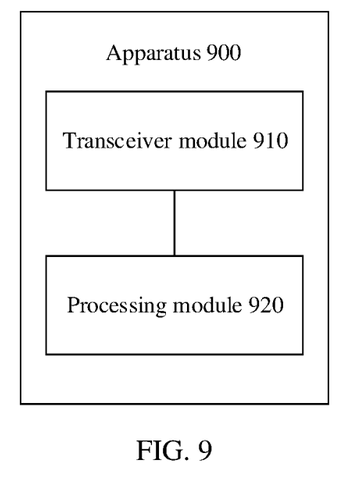
FIG. 9 is a schematic block diagram of a signal transmission apparatus according to another embodiment of this application.

FIG. 9 shows a signal transmission apparatus 900 according to an embodiment of this application. The signal transmission apparatus 900 may be the foregoing third node.

It should be understood that the signal transmission apparatus 900 may correspond to the third node in the foregoing method embodiment, and may have any function of the third node in the method.

The apparatus is applied to a communications system including at least three nodes, a second node in the at least three nodes communicates with a third node by using a first node, and the apparatus includes: a transceiver module 910, configured to receive first notification information, where the first notification information is used to indicate that a link between the first node and the second node is abnormal; and a processing module 920, configured to perform signal processing based on the first notification information.

Optionally, the second node is a lower-level node of the first node, and the first notification information further includes at least one of a link abnormality type and an amount of data that is buffered by the first node and that is to be sent to the third node.

Optionally, the second node is an upper-level node of the first node, and the first notification information further includes at least one of link wait-to-restore time and a first time-frequency resource position for link wait to restore.

Optionally, when the first notification information includes the link wait-to-restore time, the processing module 920 is specifically configured to: detect second notification information within the link wait-to-restore time, where the second notification information is used to indicate that the link is recovered; and when the second notification information is received, recover a link connection to the second node.

Optionally, when the first notification information includes the time-frequency resource position for link wait to restore, the processing module 920 is specifically configured to: detect the second notification information at the first time-frequency resource position for link wait to restore, where the second notification information is used to indicate that the link is recovered; and when the second notification information is received, recover the link connection to the second node.

Optionally, the processing module 920 is further configured to: if the second notification information is not received when the link wait-to-restore time expires, switch to a link between the third node and a fourth node, where the fourth node is used for communication between the third node and the second node, and the fourth node is different from the first node.

Optionally, the transceiver module 910 is further configured to send the second notification information to a fifth node, where the fifth node may communicate with the first node by using the third node.

Optionally, the transceiver module 910 is further configured to send the first notification information to the fifth node, where the fifth node may communicate with the first node by using the third node.

Therefore, in the signal transmission apparatus provided in this embodiment of this application, the third node receives the first notification information that is used to indicate that the link between the first node and the second node is abnormal and that is sent when the link between the first node and the second node is abnormal, and performs corresponding signal processing based on the first notification information. This improves communication efficiency.

Optionally, the signal transmission apparatus 900 in this embodiment of this application may be an access network device, or may be a chip in the access network device.

It should be understood that the signal transmission apparatus 900 according to this embodiment of this application may correspond to the third node in the signal transmission method in the embodiments in FIG. 4 to FIG. 6. In addition, the foregoing and other management operations and/or functions of the modules in the signal transmission apparatus 900 are used to implement corresponding steps in the foregoing method. For brevity, details are not described herein again.

Figure 10:
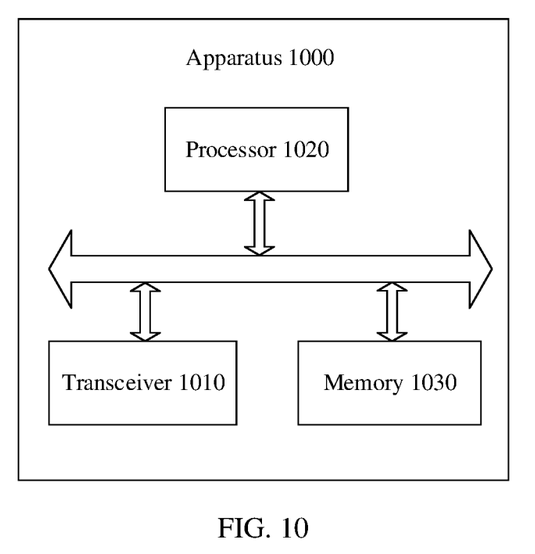
FIG. 10 is a schematic structural diagram of a signal transmission apparatus according to another embodiment of this application.

Optionally, in this embodiment of this application, if the signal transmission apparatus 900 is an access network device, the transceiver module 910 may be implemented as a transceiver 1010, and the processing module 920 may be implemented as a processor 1020. As shown in FIG. 10, a signal transmission apparatus 1000 may include the transceiver 1010, the processor 1020, and a memory 1030. The memory 1030 may be configured to store indication information, and may be further configured to store code, an instruction, and the like that are executed by the processor 1020. The transceiver 1010 may include a radio frequency circuit. Optionally, the access network device further includes a storage unit.

The storage unit may be, for example, the memory. When the access network device includes the storage unit, the storage unit is configured to store a computer-executable instruction. The processing unit is connected to the storage unit, and the processing unit executes the computer-executable instruction stored in the storage unit, so that the access network device performs the foregoing signal transmission method.

Optionally, if the signal transmission apparatus 900 is a chip in the access network device, the chip includes a processing module 910 and a transceiver module 920. The transceiver module 920 may be implemented as the transceiver 1010, and the processing module 910 may be implemented as the processor 1020. The transceiver module may be, for example, an input/output interface, a pin, or a circuit. The processing module may execute a computer-executable instruction stored in a storage unit. The storage unit is a storage unit in the chip, such as a register or a buffer; or the storage unit may be a storage unit in the access network device but outside the chip, such as a read-only memory (ROM), another type of static storage device capable of storing static information and an instruction, or a random access memory (RAM).

Optionally, the storage unit is a storage unit in the chip, such as a register or a buffer; or the storage unit may be a storage unit in the access network device but outside the chip, such as a read-only memory (ROM), another type of static storage device capable of storing static information and an instruction, or a random access memory (RAM). The storage unit is a storage unit in the chip, such as a register or a buffer; or the storage unit may be a storage unit in the access network device but outside the chip, such as a read-only memory (ROM), another type of static storage device capable of storing static information and an instruction, or a random access memory (RAM).

Figure 11:
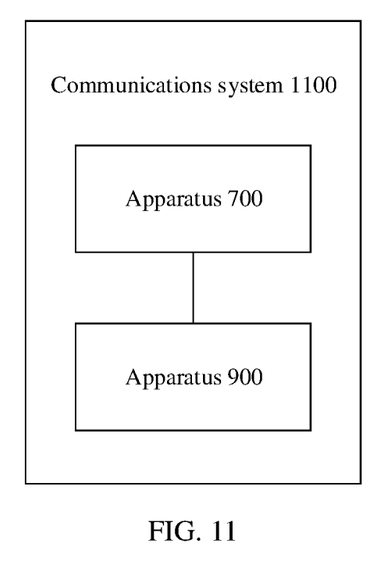
FIG. 11 is a schematic block diagram of a communications system for signal transmission according to this application.

FIG. 11 shows a communications system 1100 according to an embodiment of this application. The communications system 1100 includes: the signal transmission apparatus 700 in the embodiment shown in FIG. 7 and the signal transmission apparatus 900 in the embodiment shown in FIG. 9.

An embodiment of this application further provides a computer storage medium, and the computer storage medium may store a program instruction for indicating any one of the foregoing methods.

Optionally, the storage medium may be specifically the memory 830 or the memory 1030.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It can be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions of this application essentially, or the part contributing to the current system, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising:
   a processor, configured to determine a link between a first node and a second node is abnormal, wherein a communications system comprises the first node comprising the apparatus, the second node, and a third node, the second node communicates with the third node through the apparatus, one of the second node and the third node is a relay node, and the other one of the second node and the third node is a radio access network (RAN) device; and
   a transceiver, configured to send first notification information to the third node, wherein the first notification information indicates that the link between the first node and the second node is abnormal.

2. The apparatus according to claim 1, wherein the transceiver is further configured to:
   attempt to recover the link between the first node and the second node; and
   send the first notification information to the third node in response to failing the attempt to recover the link between the first node and the second node.

3. The apparatus according to claim 2, wherein the transceiver is further configured to send second notification information to the third node in response to successfully recovering the link within a second preset time threshold, wherein the second notification information indicates that the link is successfully recovered.

4. The apparatus according to claim 1, wherein:
   the processor is further configured to set a first preset time threshold; and
   the transceiver is further configured to send the first notification information to the second node when the link fails to be recovered and the first preset time threshold is reached.

5. The apparatus according to claim 1, wherein:
   the second node is an upper-level node of the apparatus, and the third node is a lower-level node of the apparatus; or
   the second node is a lower-level node of the apparatus, and the third node is an upper-level node of the apparatus.

6. An apparatus, comprising comprises:
   a transceiver, configured to receive first notification information from a first node, wherein a communications system comprises the first node, a second node, and a third node comprising the apparatus, the second node communicates with the apparatus through the first node, and the first notification information indicates that a link between the first node and the second node is abnormal, one of the second node and the third node is a relay node, and the other one of the second node and the third node is a radio access network (RAN) device; and
   a processor, configured to perform signal processing according to the first notification information.

7. The apparatus according to claim 6, wherein the processor is further configured to measure another available link, perform link switching, or wait for link recovery.

8. The apparatus according to claim 6, wherein the transceiver is further configured to send the first notification information to a fifth node in the communications system, wherein the fifth node is a lower-level node of the apparatus.

9. The apparatus according to claim 6, wherein the second node is a lower-level node of the first node, and the first notification information further comprises a link abnormality type or an amount of data buffered by the first node and to be sent to the third node.

10. The apparatus according to claim 6, wherein the second node is an upper-level node of the first node, and the first notification information further comprises a link wait-to-restore time or a time-frequency resource position for link-wait-to-restore.

11. A method, comprising:
    determining, by a first node in a communications system, a link between the first node and a second node is abnormal, the communications system comprises the first node, the second node, and a third node, and the second node communicates with the third node through the first node, one of the second node and the third node is a relay node, and the other one of the second node and the third node is a radio access network (RAN) device; and
    sending, by the first node, first notification information to the third node, wherein the first notification information indicates that the link between the first node and the second node is abnormal.

12. The method according to claim 11, wherein sending, by the first node, the first notification information to the third node comprises:
    attempting, by the first node, to recover the link between the first node and the second node; and
    sending, by the first node, the first notification information to the third node in response to the link failing to be recovered.

13. The method according to claim 12, wherein the method further comprises:
    sending, by the first node, second notification information to the third node in response to successfully recovering the link within a second preset time threshold, wherein the second notification information indicates that the link is recovered.

14. The method according to claim 11, wherein the method further comprises:
    setting, by the first node, a first preset time threshold; and
    when the link fails to be recovered and the first preset time threshold is reached, sending, by the first node, the first notification information to the second node.

15. The method according to claim 11, wherein:
the second node is an upper-level node of the first node, and the third node is a lower-level node of the first node; or
the second node is an lower-level node of the first node, and the third node is a upper-level node of the first node.

16. A method, comprising:
receiving, by a third node in a communications system, first notification information from a first node, wherein the communications system comprises the first node, a second node, and the third node, the second node communicates with the third node through the first node, and the first notification information indicates that a link between the first node and the second node is abnormal, and wherein one of the second node and the third node is a relay node, and the other one of the second node and the third node is a radio access network (RAN) device; and
performing, by the third node, signal processing according to the first notification information.

17. The method according to claim 16, wherein the method further comprises:
measuring, by the third node, another available link;
performing, by the third node, link switching; or
waiting for, by the third node, link recovery.

18. The method according to claim 16, wherein the method further comprises:
sending, by the third node, the first notification information to a fifth node in the communications system, wherein the fifth node is a lower-level node of the third node.

19. The method according to claim 16, wherein the second node is a lower-level node of the first node, and the first notification information further comprises a link abnormality type or an amount of data buffered by the first node and to be sent to the third node.

20. The method according to claim 16, wherein the second node is an upper-level node of the first node, and the first notification information further comprises link wait-to-restore time or a time-frequency resource position for link-wait-to-restore.

* * * * *